(12) United States Patent
Chi

(10) Patent No.: US 10,976,612 B1
(45) Date of Patent: Apr. 13, 2021

(54) CURVED LIQUID CRYSTAL DISPLAY PANEL AND DISPLAY DEVICE

(71) Applicant: TCL CHINA STAR OPTOELECTRONICS TECHNOLOGY CO., LTD., Guangdong (CN)

(72) Inventor: Baolin Chi, Guangdong (CN)

(73) Assignee: TCL China Star Optoelectronics Technology Co., Ltd., Guangdong (CN)

( * ) Notice: Subject to any disclaimer, the term of this patent is extended or adjusted under 35 U.S.C. 154(b) by 0 days.

(21) Appl. No.: 16/627,834

(22) PCT Filed: Dec. 20, 2019

(86) PCT No.: PCT/CN2019/127088
§ 371 (c)(1),
(2) Date: Dec. 31, 2019

(30) Foreign Application Priority Data

Dec. 10, 2019 (CN) .......................... 201911255281.4

(51) Int. Cl.
*G02F 1/13363* (2006.01)
*G02F 1/1333* (2006.01)

(52) U.S. Cl.
CPC .... *G02F 1/13363* (2013.01); *G02F 1/133345* (2013.01); *G02F 1/133633* (2021.01); *G02F 2201/56* (2013.01)

(58) Field of Classification Search
CPC ........... G02F 1/13363; G02F 1/133345; G02F 2001/133633; G02F 2201/56
See application file for complete search history.

(56) References Cited

U.S. PATENT DOCUMENTS

| 2011/0228190 | A1 | 9/2011 | Yang et al. |
| 2014/0226111 | A1 | 8/2014 | Kim |
| 2017/0235177 | A1 | 8/2017 | Xie |
| 2018/0031906 | A1* | 2/2018 | Park .................. G02F 1/133514 |

(Continued)

FOREIGN PATENT DOCUMENTS

| CN | 1749822 A | 3/2006 |
| CN | 1945396 A | 4/2007 |
| CN | 105182622 A | 12/2015 |

(Continued)

*Primary Examiner* — Nathanael R Briggs
(74) *Attorney, Agent, or Firm* — Mark M. Friedman

(57) ABSTRACT

The present invention provides a curved liquid crystal display panel and a display device. The curved liquid crystal display panel includes a middle region, an edge region, and has a cross-sectional structure including a first substrate, a second substrate disposed opposite to the first substrate, a liquid crystal layer disposed between the first substrate and the second substrate, a compensation layer disposed on a side of the second substrate in the middle region away from the liquid crystal layer, and compensating liquid crystal molecules filling a space between the second substrate and the compensation layer. A difference between a middle thickness of the middle region of the curved liquid crystal display panel and an edge thickness of the edge region of the curved liquid crystal display panel is less than or equal to a preset value. The present invention can improve transmittance and reduce color shift, thereby improving display effects.

19 Claims, 1 Drawing Sheet

(56) References Cited

U.S. PATENT DOCUMENTS

2018/0157086 A1* 6/2018 Cho .................... G02F 1/13363
2019/0196235 A1* 6/2019 Robinson ............... G02B 27/30

FOREIGN PATENT DOCUMENTS

| CN | 105182624 A | 12/2015 | | |
|----|-------------|---------|---|---|
| CN | 108828826 A | 11/2018 | | |
| TW | 201133430 A | 10/2011 | | |
| WO | WO-2014015608 A1 * | 1/2014 | ....... | G02F 1/133516 |

* cited by examiner

CURVED LIQUID CRYSTAL DISPLAY PANEL AND DISPLAY DEVICE

FIELD OF INVENTION

The present invention is related to the field of display technology, and specifically to a curved liquid crystal display panel and a display device.

BACKGROUND OF INVENTION

Curved screens can generally be implemented by bending flexible organic light-emitting diode (OLED) display panels and liquid crystal display (LCD) panels. Curved surfaces are not only a subversion of appearances of TVs but also a significant improvement in viewing comfort. A proper curvature provides a wider field of view and a stronger presence. Human eyes are convex and curved, and curvature of a curved screen can ensure an equal distance of the human eyes, thereby improving viewing effects.

SUMMARY OF INVENTION

A curved liquid crystal display panel is obtained by bending a flat display panel. As shown in FIG. 1, the curved liquid crystal display panel includes a first substrate 10, a second substrate 20, and spacers 21 disposed between the first substrate 10 and the second substrate 20. The higher a bending curvature of a position (a middle region of the display panel), the greater a force it receives. The greater the force on the spacers 21, the greater compression is, and a thickness of a liquid crystal cell (cell gap) d becomes smaller. Because transmittance is proportional to the thickness, transmittance (Tr) of the middle region is less than transmittance of an edge region when the thickness of the liquid crystal cell. When the transmittance of the middle region and the transmittance of the edge region are different, the Tr corresponding to RGB is also different. As a result, images in the middle region and images in the edge region are different. After bending, a direction of an electric field in the curved liquid crystal display panel changes, and an orientation of corresponding to liquid crystal molecules also changes, which causes color shift and reduces display effects.

Therefore, it is necessary to provide a curved liquid crystal display panel and a display device to solve problems in the prior art.

A purpose of the present invention is to provide the curved liquid crystal display panel and the display device, which can improve the transmittance and reduce the color shift, thereby improving the display effects.

In order to solve the above problems, the present invention provides the curved liquid crystal display panel including a middle region and an edge region and having a cross-sectional structure including:

a first substrate;

a second substrate disposed opposite to the first substrate;

a liquid crystal layer disposed between the first substrate and the second substrate;

a compensation layer disposed on a side of the second substrate in the middle region away from the liquid crystal layer; and a plurality of compensating liquid crystal molecules filling a space between the second substrate and the compensation layer;

wherein a difference between a middle thickness and an edge thickness is less than or equal to a preset value, the middle thickness is a thickness of the middle region of the curved liquid crystal display panel, and the edge thickness is a thickness of the edge region of the curved liquid crystal display panel.

The present invention further provides the display device including the above curved liquid crystal display panel.

The curved liquid crystal display panel and the display device of the present invention dispose the compensation layer on the side of the second substrate in the middle region away from the liquid crystal layer and fill the plurality of compensating liquid crystal molecules in the space between the second substrate and the compensation layer, which makes a thickness of the curved liquid crystal display panel uniform and increases the transmittance. In addition, an exit angle of light is increased, the color shift is reduced, and the display effects are improved.

DETAILED DESCRIPTION OF PREFERRED EMBODIMENTS

Figure 1:
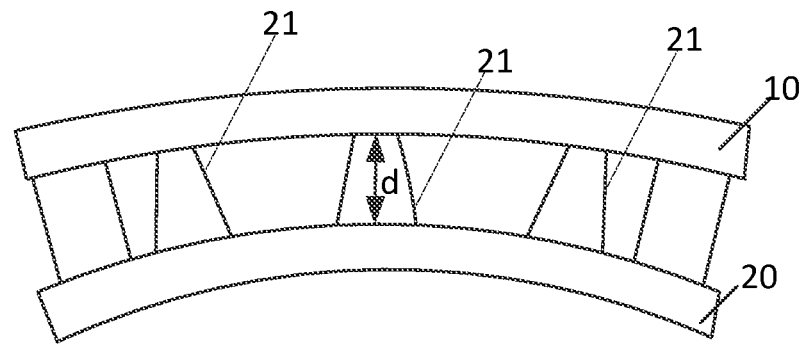
FIG. 1 is a structural diagram of a curved liquid crystal display panel in the prior art.

Examples are described below with reference to the appended drawings, and the drawings illustrate particular embodiments in which the present invention may be practiced. Directional terms mentioned in the present invention, such as upper, lower, front, rear, left, right, in, out, side, etc., only refer to directions in the accompanying drawings. Thus, the adoption of directional terms is used to describe and understand the present invention, but not to limit the present invention. In the drawings, units of similar structures are using the same numeral to represent.

Figure 2:
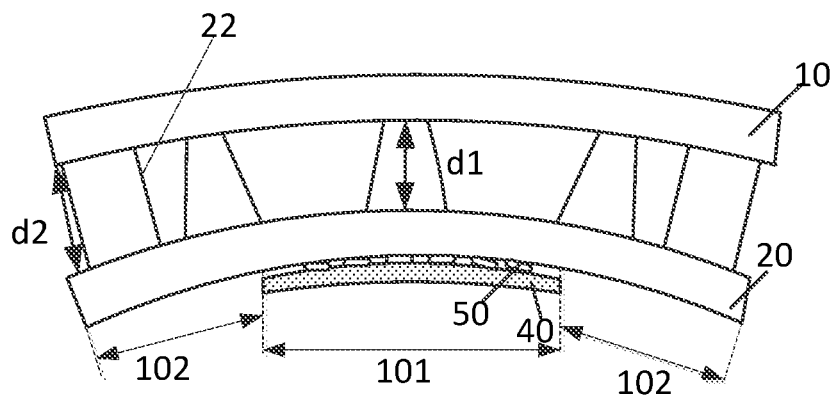
FIG. 2 is a structural diagram of a curved liquid crystal display panel of the present invention.
Figure 3:
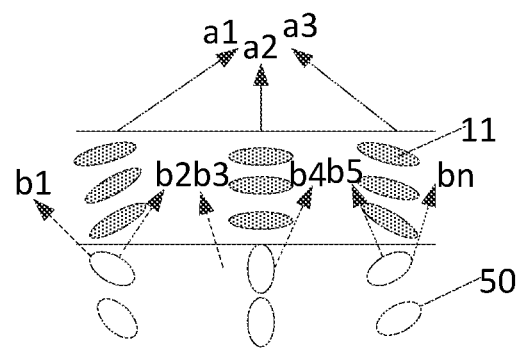
FIG. 3 is a light path diagram of the curved liquid crystal display panel of the present invention.

Please refer to FIGS. 2 and 3, FIG. 2 is a structural diagram of a curved liquid crystal display panel of the present invention.

As shown in FIG. 2, in an embodiment, the curved liquid crystal display panel of the present invention includes a middle region 101 and an edge region 102. The edge region 102 is disposed on two sides of the middle region 101. A cross-sectional structure of the curved liquid crystal display panel includes a first substrate 10, a second substrate 20, a liquid crystal layer (not shown), and a compensation layer 40.

The second substrate 20 is disposed opposite to the first substrate 10. The second substrate 20 is close to a display side, which means that the second substrate 20 is close to an observer.

The liquid crystal layer is disposed between the first substrate 10 and the second substrate 20. With reference to FIG. 3, the liquid crystal layer can be filled with a plurality of deflecting liquid crystal molecules 11. A middle gap is a gap between the first substrate 10 and the second substrate 20 in the middle region 101. An edge gap is a gap between the first substrate 10 and the second substrate 20 in the edge region 102. The middle gap is less than the edge gap. For example, a minimum value in the middle gap is d1, a maximum value in the edge gap is d2. The edge gap is greater than the middle gape before the compensation layer 40 is disposed.

The compensation layer 40 is disposed on a side of the second substrate 20 in the middle region 101 away from the liquid crystal layer, which means that the compensation layer 40 is located on an outer side of the second substrate 20. Material of the compensation layer 40 is an insulating material and can be at least one of SiNx and SiO2. Understandably, the material of the compensation layer 40 is not limited herein. When disposing the compensation layer 40, a difference between a middle thickness and an edge thickness is less than or equal to a preset value (the preset value is close to zero), which means that the middle thickness and the edge thickness are approximately equal. The middle thickness is a thickness of the middle region 101 of the curved liquid crystal display panel, and the edge thickness is a thickness of the edge region 102 of the curved liquid crystal display panel. In other words, the compensation layer 40 is used to make a thickness of the curved liquid crystal display panel uniform, which means that the compensation layer 40 is used to reduce the difference between the middle thickness and the edge thickness.

In order to improve transmittance, a thickness of the compensation layer 40 is determined according to a difference between a middle gap and a preset gap. The preset gap is the maximum value in the edge gap or the minimum value in the middle gap. For example, the preset gap is d2

In an embodiment, the thickness of the compensation layer 40 is proportional to a bending curvature of the curved liquid crystal display panel, which means that the higher the bending curvature of a position, the thicker the compensation layer 40 is. A size of the middle gap is inversely proportional to the bending curvature of the curved liquid crystal display panel. In order to further increase the transmittance, as shown in FIG. 2, the thickness of the compensation layer 40 gradually decreases from the middle to the edge region.

A plurality of compensating liquid crystal molecules 50 fill a space between the second substrate 20 and the compensation layer 40. Understandably, the plurality of compensating liquid crystal molecules 50 are randomly distributed, and tilt angles thereof are not limited herein. The plurality of compensating liquid crystal molecules 50 with multiple tilt angles are distributed between the second substrate 20 and the compensation layer 40. In order to reduce color shift, each of the plurality of deflecting liquid crystal molecules is a disc-like liquid crystal molecule. A ratio of a long axis to a short axis of each of the plurality of deflecting liquid crystal molecules 11 is greater than a ratio of a long axis to a short axis of each of the plurality of compensating liquid crystal molecules 50.

As shown in FIG. 3, the plurality of deflecting liquid crystal molecules 11 refract light in fixed directions a1 to a3 under an electric field. When the plurality of compensating liquid crystal molecules 50 are disposed, because the plurality of compensating liquid crystal molecules 50 have multiple tilt angles, the light is refracted in multiple directions b1 to bn. Therefore, an exit angle of the light is increased, the transmission of liquid crystal molecules in various viewing angles is increased, color saturation in the middle region is increased, the color shift is reduced, and the display effects are improved.

This embodiment only takes the curved liquid crystal display panel bent along a first preset direction (downward) as an example. Understandably, when the curved liquid crystal display panel is bent upward, the compensation layer is located on an outer side of an upper substrate, which has a similar structure to FIG. 2.

Referring to FIG. 2, the curved liquid crystal display panel further includes a sealant 22 disposed around the first substrate 10 or the second substrate 20. The first substrate 10 can be an array substrate, and the second substrate 20 can be a color filter substrate. Understandably, the curved liquid crystal display panel can further include two or more of the sealants 22. When the curved liquid crystal display panel includes two sealants, one sealant surrounds an outer side of the other sealant.

Because the compensation layer is disposed on an outer side of a position where a bending curvature of the second substrate is large, a difference between thicknesses of liquid crystal cells can be reduced, the transmittance in the middle region is prevented from reduction, and overall transmittance can be improved. In addition, because the plurality of compensating liquid crystal molecules fill the space between the second substrate and the compensation layer, the exit angle of the light is increased, which means that the transmission of liquid crystal molecules in various viewing angles is increased, color saturation in the middle region is increased, the color shift is reduced, and the display effects are improved.

The present invention further provides a display device including the above curved liquid crystal display panel.

The curved liquid crystal display panel and the display device of the present invention dispose the compensation layer on the side of the second substrate in the middle region away from the liquid crystal layer and fill the plurality of compensating liquid crystal molecules in the space between the second substrate and the compensation layer, which makes a thickness of the curved liquid crystal display panel uniform and increases the transmittance. In addition, an exit angle of light is increased, the color shift is reduced, and the display effects are improved.

Reference throughout this specification to "an embodiment," "some embodiments," "one embodiment," "another example," "an example," "a specific example," or "some examples," means that a particular feature, structure, material, or characteristic described in connection with the embodiment or example is included in at least one embodiment or example of the present invention. Thus, the appearances of the phrases such as "in some embodiments," "in one embodiment," "in an embodiment," "in another example," "in an example," "in a specific example," or "in some examples," in various places throughout this specification are not necessarily referring to the same embodiment or example of the present invention. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present invention, and changes, alternatives, and modifications can be made in the embodiments without departing from scope of the present invention.

What is claimed is:

1. A curved liquid crystal display panel, comprising a middle region and an edge region and having a cross-sectional structure comprising:
   a first substrate;
   a second substrate disposed opposite to the first substrate;
   a liquid crystal layer disposed between the first substrate and the second substrate;
   a compensation layer disposed on a side of the second substrate in the middle region away from the liquid crystal layer; and a plurality of compensating liquid crystal molecules filling a space between the second substrate and the compensation layer, wherein the plurality of compensating liquid crystal molecules are randomly distributed and have multiple tilt angles;

wherein a middle thickness is about equal to an edge thickness, the middle thickness is a thickness of the middle region of the curved liquid crystal display panel, and the edge thickness is a thickness of the edge region of the curved liquid crystal display panel;

wherein a thickness of the compensation layer is a difference between a middle gap and an edge gap, the middle gap is a gap between the first substrate and the second substrate in the middle region, and the edge gap is a gap between the first substrate and the second substrate in the edge region; and wherein material of the compensation layer is an insulating material.

2. A curved liquid crystal display panel, comprising a middle region and an edge region and having a cross-sectional structure comprising:
a first substrate;
a second substrate disposed opposite to the first substrate;
a liquid crystal layer disposed between the first substrate and the second substrate;
a compensation layer disposed on a side of the second substrate in the middle region away from the liquid crystal layer; and
a plurality of compensating liquid crystal molecules filling a space between the second substrate and the compensation layer, wherein the plurality of compensating liquid crystal molecules are randomly distributed and have multiple tilt angles;
wherein a middle thickness is about equal to an edge thickness, the middle thickness is a thickness of the middle region of the curved liquid crystal display panel, and the edge thickness is a thickness of the edge region of the curved liquid crystal display panel.

3. The curved liquid crystal display panel according to claim 2, wherein a thickness of the compensation layer is a difference between a middle gap and an edge gap, the middle gap is a gap between the first substrate and the second substrate in the middle region, and the edge gap is a gap between the first substrate and the second substrate in the edge region.

4. The curved liquid crystal display panel according to claim 3, wherein the middle gap is less than the edge gap.

5. The curved liquid crystal display panel according to claim 2, wherein a thickness of the compensation layer is proportional to a bending curvature of the curved liquid crystal display panel.

6. The curved liquid crystal display panel according to claim 2, wherein material of the compensation layer is an insulating material.

7. The curved liquid crystal display panel according to claim 2, wherein the liquid crystal layer is filled with a plurality of deflecting liquid crystal molecules, and a ratio of a long axis to a short axis of each of the plurality of deflecting liquid crystal molecules is greater than a ratio of a long axis to a short axis of each of the plurality of compensating liquid crystal molecules.

8. The curved liquid crystal display panel according to claim 7, wherein each of the plurality of deflecting liquid crystal molecules is a disc-like liquid crystal molecule.

9. The curved liquid crystal display panel according to claim 2, wherein a thickness of the compensation layer gradually decreases from the middle region to the edge region.

10. The curved liquid crystal display panel according to claim 2, wherein the second substrate is close to a display side.

11. A display device, comprising a curved liquid crystal display panel, wherein the curved liquid crystal display panel comprising a middle region and an edge region and having a cross-sectional structure comprising:
a first substrate;
a second substrate disposed opposite to the first substrate;
a liquid crystal layer disposed between the first substrate and the second substrate;
a compensation layer disposed on a side of the second substrate in the middle region away from the liquid crystal layer; and
a plurality of compensating liquid crystal molecules filling a space between the second substrate and the compensation layer, wherein the plurality of compensating liquid crystal molecules are randomly distributed and have multiple tilt angles;
wherein a middle thickness is about equal to an edge thickness, the middle thickness is a thickness of the middle region of the curved liquid crystal display panel, and the edge thickness is a thickness of the edge region of the curved liquid crystal display panel.

12. The display device according to claim 11, wherein a thickness of the compensation layer is a difference between a middle gap and an edge gap, the middle gap is a gap between the first substrate and the second substrate in the middle region, and the edge gap is a gap between the first substrate and the second substrate in the edge region.

13. The display device according to claim 12, wherein the middle gap is less than the edge gap.

14. The display device according to claim 11, wherein a thickness of the compensation layer is proportional to a bending curvature of the curved liquid crystal display panel.

15. The display device according to claim 11, wherein material of the compensation layer is an insulating material.

16. The display device according to claim 11, wherein the liquid crystal layer is filled with a plurality of deflecting liquid crystal molecules, and a ratio of a long axis to a short axis of each of the plurality of deflecting liquid crystal molecules is greater than a ratio of a long axis to a short axis of each of the plurality of compensating liquid crystal molecules.

17. The display device according to claim 16, wherein each of the plurality of deflecting liquid crystal molecules is a disc-like liquid crystal molecule.

18. The display device according to claim 11, wherein a thickness of the compensation layer gradually decreases from the middle region to the edge region.

19. The display device according to claim 11, wherein the second substrate is close to a display side.

* * * * *